April 15, 1924.
E. Q. MOSES
1,490,707
SAFETY BRAKE OPERATING MECHANISM
Filed March 20. 1922
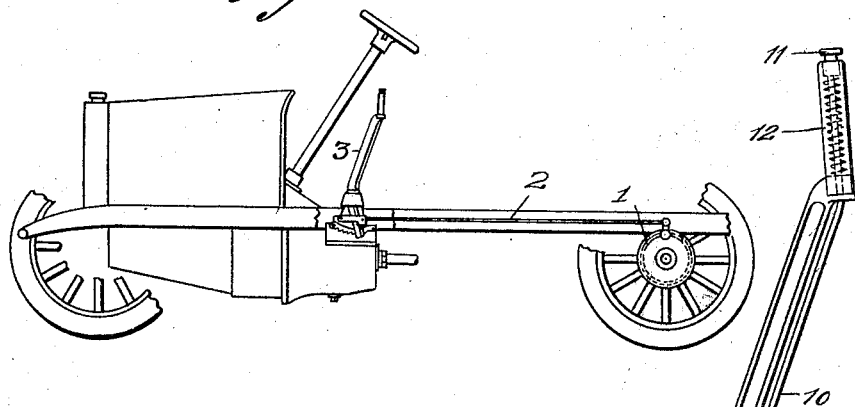
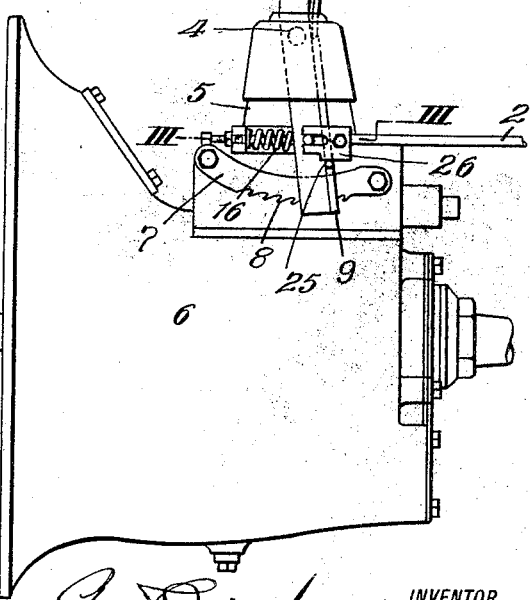
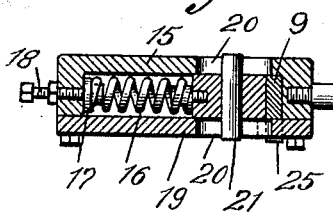
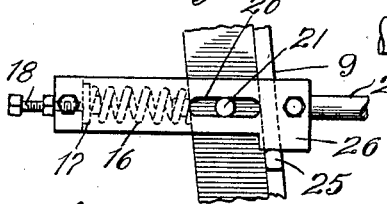
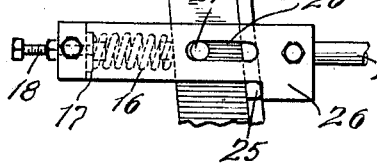
INVENTOR
BY
ATTORNEYS Patented Apr. 15, 1924.

1,490,707

UNITED STATES PATENT OFFICE.

EDMUND QUINCY MOSES, OF NEW YORK, N. Y.

SAFETY BRAKE-OPERATING MECHANISM.

Application filed March 20, 1922. Serial No. 545,053.

*To all whom it may concern:*

Be it known that I, EDMUND QUINCY MOSES, a citizen of the United States, and a resident of the city, county, and State of New York, have invented certain new and useful Improvements in Safety Brake-Operating Mechanism, of which the following is a specification.

This invention relates to safety brake mechanism of the general character described in my patent application, Serial No. 463,067, filed April 20, 1921. The principal object of the invention is to provide a simplified and effective mechanism for insuring that when the brake is applied it is applied with sufficient force to properly set the brakes; which will eliminate the danger of operation of the vehicle with dragging brakes, as it insures that the brakes are either firmly set or are completely released; which will prevent the brakes from being accidentally set upon going over a bump; which will largely eliminate wear on the brake ratchet; and which will render the application of the brakes easier and quieter and avoid the snapping of the pawl mechanism over the ratchet. Other objects and advantages of the invention will be apparent.

In the accompanying drawings, in which I have illustrated one preferred embodiment of the invention, Figure 1 is a diagrammatic view of a motor vehicle chassis showing the application of the invention thereto.

Figure 2 is a side elevation of a vehicle transmission casing showing the brake lever and brake pull rod and improved mechanism for locking the brake in applied position.

Figure 3 is a horizontal section view on line III—III of Figure 2.

Figure 4 is a side elevation of the parts shown in Figure 3.

Figure 5 is a view similar to Figure 4 showing a different position of the parts.

Referring to the drawings in detail, 1 represents the emergency brake band and drum of the vehicle wheel. 2 is the pull rod by which power is applied to set the brake. 3 is the brake lever which is pivoted at 4 to a support 5, which may be mounted on the transmission casing 6 or other suitable part of the vehicle. Also attached to the support 5 is a toothed rack or ratchet bar 7 having the teeth 8. Mounted to slide vertically on the lower end of the lever 3, is a pawl member 9 in the form of a slotted plate, through the slot in which passes the fixed ratchet bar 7. This pawl member is adapted to be moved up and down by push rod 10 operated by push button 11 at the upper end of the lever. A suitable spring, indicated in dotted lines at 12 in the Figure 2, is located in the brake lever handle and tends to hold the push rod and push button in upward position and the pawl member in engagement with the teeth 8 on the ratchet bar.

In accordance with the present invention the pull rod 2, instead of being directly pivoted to the brake lever, is attached to a yoke 15 which surrounds the lower end of the brake lever and is of sufficient size to permit some movement of the brake lever therein. A yielding connection is provided between the yoke and the brake lever so that when sufficient power is applied to the brake lever it will cause the yielding connection to yield to a limited extent, thereby producing a limited movement between the brake lever and the yoke, but also applying a force to the yoke and pull rod through the yielding connection, sufficient to apply the brake. In the construction illustrated, the yielding connection is in the form of a spring 16 which bears at one end against the forward side of the brake lever and at the other end against an abutment 17 carried by an adjusting screw 18 by which the position of the abutment and thereby the initial tension of the spring 16 can be adjusted. The front of the yoke 15 is covered by a removable plate 19 and both the plate and rear wall of the yoke are slotted as indicated at 20, to receive a guide pin 21 mounted in the brake lever and serving to hold the yoke against up and down movement with respect to the brake lever.

In accordance with the present invention it is not desired to have the pawl 9 engage the teeth on the ratchet bar until a predetermined brake applying force has been exerted upon the lever. To accomplish this result suitable interlocking devices are provided which hold the pawl in depressed position until the desired force has been exerted. In the construction illustrated these interlocking devices comprise a lug 25 projecting laterally from the upper end of the pawl and adapted to engage a downwardly projecting lug 26 on the plate 19. Normally the engagement of the lug 26 over the lug 25 will hold the pawl in inoperative position so that the brake is fully released. This position of the parts is shown in Figures 2 and 4. When it is desired to apply the brake the lever is pulled and force is exerted through the spring 16 and yoke 15 to the pull rod 2. When only a moderate amount of force is desired, as in using the brake while descending a hill for example, the parts remain in this position and the brake is controlled by the hand of the operator. When it is desired to set the brake, however, so as to hold the car when standing on an incline for instance, then the operator exerts more force on the lever and the spring 16 is compressed to a certain extent, thereby permitting the brake lever and pawl to move forward with respect to the yoke. When the spring is sufficiently compressed with the corresponding pull on the pull rod 2 insuring that the brake is properly set, then the lug 25 will move out from under the lug 26 into the position shown in Figure 5, thereby releasing the pawl so that it moves upwardly and engages the appropriate tooth 8 and locks the brake in applied position. When the brake is to be released the push button 11 is depressed, thereby forcing down the pawl and the lug 25, and when the pressure is released from the brake lever the spring 16 will immediately restore the yoke to its original position, thereby moving the lug 26 over the lug 25 and maintaining the pawl out of engagement with the ratchet bar. A complete release of the brake is thus insured so that no dragging is possible. The spring 16 is made of such stiffness or is so adjusted that it is under sufficient initial stress to prevent the lug 25 from disengaging the lug 26 until the desired amount of force has been applied. Should the spring 16 weaken or break, this would not prevent the brake from being used as the pin 21 would come up against the ends of the slots 20 in the yoke and thus permit the brake to be operated in the ordinary manner of hand brakes, although without the advantages of the present invention.

While I have shown and described in detail, one preferred embodiment of my invention, I realize that the same may be embodied in other constructions, and I do not wish to limit myself to the particular means set forth. On the contrary, I intend to cover my invention broadly in whatever form its principle may be embodied.

Having thus described my invention, I claim—

1. The combination with a brake lever and pull rod of a vehicle brake, of a yielding connection between said lever and pull rod, means for locking the brake lever in applied position, and interlocking devices for normally holding said locking means out of operation, said interlocking devices being actuated by a relative movement between said brake lever and pull rod.

2. In combination, a lever, a pawl and ratchet mechanism for locking said lever in desired position, a member to which force is to be applied by said lever, a yielding connection between said member and said lever, and interlocking means controlled by a relative movement between said member and said lever for preventing the lever from being locked until such relative movement has taken place.

3. In combination, a lever, a pawl carried thereby, a yoke, a yielding connection between said yoke and lever through which force is applied from the lever to the device to be operated thereby, and means movable with said yoke for holding the pawl on the lever in inoperative position until said yielding means has yielded.

4. In combination, a brake lever, a pawl slidably mounted thereon and having a shoulder thereon, a pull rod, a yoke attached to the pull rod and surrounding the lever, a spring interposed between the yoke and lever through which power is transmitted from the lever to the yoke and pull rod, and a member on the yoke engaging the shoulder on the pawl and holding the pawl normally in inoperative position, said shoulder and member being adapted to move relatively so as to release the pawl when the spring is compressed by the power applied to the lever.

5. The combination with a vehicle brake, of means for applying the same, means for locking the brake in applied position, an interference device for preventing the locking means from acting and means for causing withdrawal of said interference device to permit the brake locking means to become operative upon the application of a sufficient brake applying force.

In testimony whereof I have affixed my signature to this specification.

EDMUND QUINCY MOSES.